US012173874B1

(12) United States Patent
Yu

(10) Patent No.: US 12,173,874 B1
(45) Date of Patent: Dec. 24, 2024

(54) FOLDABLE DOUBLE-SIDED LIGHT-EMITTING FLOODLIGHT

(71) Applicant: Ninghai Ruihai Electric APPLIANCE Co., Ltd., Zhejiang (CN)

(72) Inventor: Haibo Yu, Zhejiang (CN)

(*) Notice: Subject to any disclaimer, the term of this patent is extended or adjusted under 35 U.S.C. 154(b) by 0 days.

(21) Appl. No.: 18/537,083

(22) Filed: Dec. 12, 2023

(30) Foreign Application Priority Data

Sep. 15, 2023 (CN) ......................... 202322518941.1

(51) Int. Cl.

| | |
|---|---|
| ***F21V 21/30*** | (2006.01) |
| ***F21V 21/008*** | (2006.01) |
| ***F21V 23/04*** | (2006.01) |
| *F21Y 105/10* | (2016.01) |
| *F21Y 115/10* | (2016.01) |

(52) U.S. Cl.
CPC ............ *F21V 21/30* (2013.01); *F21V 21/008* (2013.01); *F21V 23/04* (2013.01); *F21Y 2105/10* (2016.08); *F21Y 2115/10* (2016.08)

(58) Field of Classification Search
CPC ......... F21V 23/04; F21V 21/30; F21V 17/007
See application file for complete search history.

(56) References Cited

U.S. PATENT DOCUMENTS

| | | | | |
|---|---|---|---|---|
| 4,658,337 | A * | 4/1987 | Burke | F21V 17/107 362/225 |
| 5,890,793 | A * | 4/1999 | Stephens | G03B 15/06 362/240 |
| 8,430,529 | B2 * | 4/2013 | Christ | F21V 21/08 362/183 |
| 9,046,231 | B2 * | 6/2015 | Christ | F21V 23/0414 |
| 11,867,376 | B1 * | 1/2024 | Chen | F21S 43/26 |
| 2005/0190551 | A1 * | 9/2005 | Rempel | F21V 21/30 362/162 |
| 2016/0209012 | A1 * | 7/2016 | Mumma | F21V 21/30 |
| 2018/0031214 | A1 * | 2/2018 | Li | F21V 3/00 |
| 2024/0167676 | A1 * | 5/2024 | Bourne | F21L 4/08 |

* cited by examiner

*Primary Examiner* — Tracie Y Green
*Assistant Examiner* — Michael Chiang

(57) ABSTRACT

A foldable double-sided light-emitting floodlight, involving the technical field of lamps. The floodlight comprises two lamps, the bottom of which are movably hinged via articulation piece, and the angle between the two lamps can be adjusted through articulation piece; the top of lamps is provided with handles for carrying lamps, inside one of the handles movably provided with a hook for hanging lamp; LED floodlight panels are arranged inside the lamp; the articulation piece includes hinged seats provided at the bottom of two lamps respectively and rotating shaft running through two hinged seats. Compared with floodlights with single use on market, articulation piece can adjust the angle between two lamps, so that it has a variety of using ways of standing, laid flat, elevating and laid flat, magnetic suction, hanging, and can be matched with camera frame to cope with uses in different scenarios.

9 Claims, 10 Drawing Sheets

FOLDABLE DOUBLE-SIDED LIGHT-EMITTING FLOODLIGHT

1. TECHNICAL FIELD

The invention relates to the technical field of lamps, and specifically relates to a foldable double-sided light-emitting floodlight.

2. BACKGROUND ART

Floodlight is a point light source that can uniformly illuminate in all directions, the standard floodlight is used to illuminate the entire scene, and more than one floodlight can be used in the scene to produce better results; mounting the bulbs for shooting into a large reflective umbrella for use as a high-brightness diffused light source, although indispensable to the studio lighting, can be regarded as a light source with good lighting effect for the general amateur indoor photography.

The common floodlights on the market are mostly for indoor use, with streamlined structure, single fixing method and the application scene, which has been unable to meet the user's needs.

3. SUMMARY OF THE INVENTION

The invention provides a foldable double-sided light-emitting floodlight to solve problem in background art.

In order to realize said purpose, the invention provides the following technical scheme: a foldable double-sided light-emitting floodlight, comprising two lamps, the bottom of which are movably hinged via articulation piece, and the angle between the two lamps can be adjusted through articulation piece; the top of lamps are provided with handles for carrying lamps, inside one of the handles movably provided with a hook for hanging lamp; LED floodlight panels are arranged inside the lamps;

Further, the articulation piece includes hinged seats provided at the bottom of two lamps respectively and rotating shaft running through two hinged seats. Two ends of said rotating shaft are sleeved with rotating shaft presssers.

Further, the top of said handle is embedded with not less than one magnet, and the top of one of said lamps is pre-built with nut.

Further, a control component electrically connected to two LED floodlight panels is provided inside one of said lamp.

Further, said control component comprises a main board and a battery electrically connected to the main board, and indicator light set, on/off button and charging port are integrated on one side of said main board.

Further, one side of said main board is further provided with a light guide member for guiding light to the indicator light set and a silicone button for guarding the on/off button and the charging port.

Further, the interior of said lamp is provided with a waterproof silicone gel located on one side of the main board.

Further, one side of said LED floodlight panel is provided with a light panel presser, and said light panel presser is fixed to the interior of the lamp by screws.

Further, said lamps include the first lamp body and second lamp body, a sealing ring provided between said first lamp body and second lamp body.

Further, one side of said second lamp body is provided with a rubber-coated housing, and a lens located on one side of the LED floodlight panel is provided in said second lamp body.

Compared with the prior art, the invention provides a foldable double-sided light-emitting floodlight, which has following advantages:

In the foldable double-sided light-emitting floodlight, compared with floodlights with single use on market, articulation piece can adjust the angle between two lamps, so that it has a variety of using ways of standing, laid flat, elevating and laid flat, magnetic suction, hanging, and can be matched with camera frame to cope with uses in different scenarios, with a broad application prospect and meets the economic benefits.

4. BRIEF DESCRIPTION OF ACCOMPANY DRAWINGS

Figure 1:
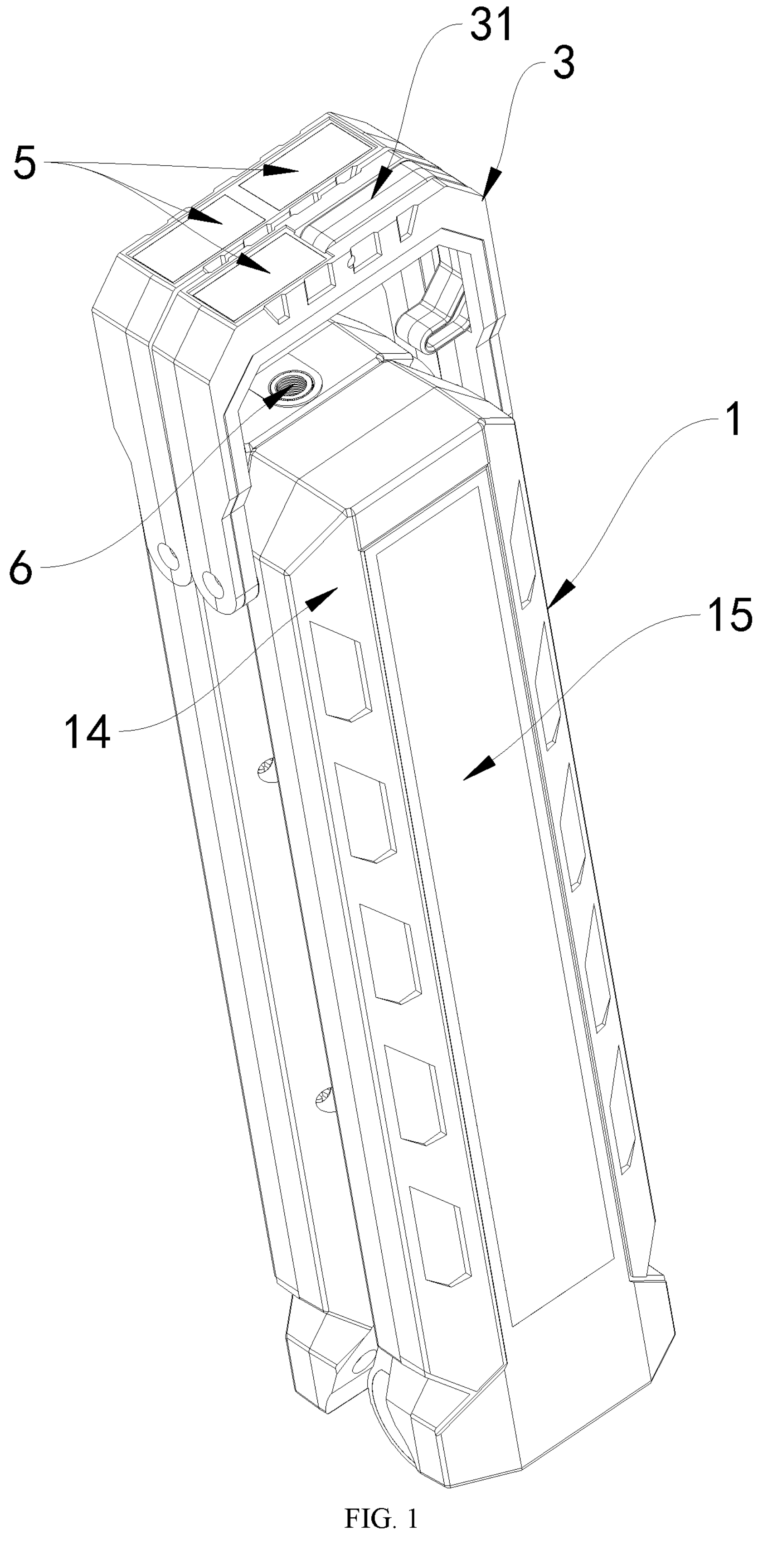
FIG. 1 is the structural diagram of the invention.

In the drawings: 1 lamp, 11 first lamp body, 12 second lamp body, 13 sealing ring, 14 rubber-coated housing, 15 lens, 2 articulation piece 21 hinged seat, 22 rotating shaft, 23 rotating shaft presssер, 3 handle, 31 hook, 4 LED floodlight panel, 41 light panel presser, 5 magnet, 6 nut, 7 control component, 71 main board, 72 battery, 73 silicone button, 74 on/off button, 75 charging port, 76 light guide member, 8 waterproof silicone gel, 9 positioning block.

5. SPECIFIC EMBODIMENT OF THE INVENTION

The invention is further described in detail hereinafter with reference to the drawings and embodiment.

Embodiment 1, with reference to the FIG. 1 to FIG. 4, the invention provides a foldable double-sided light-emitting floodlight, comprising two lamps 1, the bottom of which are movably hinged via articulation piece 2, and the angle between the two lamps can be adjusted through articulation piece 2; the top of lamps 1 is provided with handles 3 for carrying lamps 1, inside one of the handles 3 movably provided with a hook 31 for hanging lamp 1; LED floodlight panels 4 are arranged inside the lamps 1;

Specifically, the articulation piece 2 includes hinged seats 21 provided at the bottom of two lamps 1 respectively and rotating shaft 22 running through two hinged seats 21. Two ends of said rotating shaft 22 are sleeved with rotating shaft presssers 23.

Specifically, the top of said handle 3 is embedded with not less than one magnet 5, and the top of one of said lamps 1 is pre-built with nut 6. The magnet 5 is provided to facilitate the use of the lamps 1 adhered to the metal object.

Specifically, a control component 7 electrically connected to two LED floodlight panels 4 is provided inside one of said lamp 1; said control component 7 comprises a main board 71 and a battery 72 electrically connected to the main board 71, and indicator light set, on/off button 74 and charging port 75 are integrated on one side of said main board 71. The LED floodlight panel 4 can be controlled to light up through the on/off button 74, and the battery 72 can be charged through the charging port 75 matched with the data cable.

Figure 2:
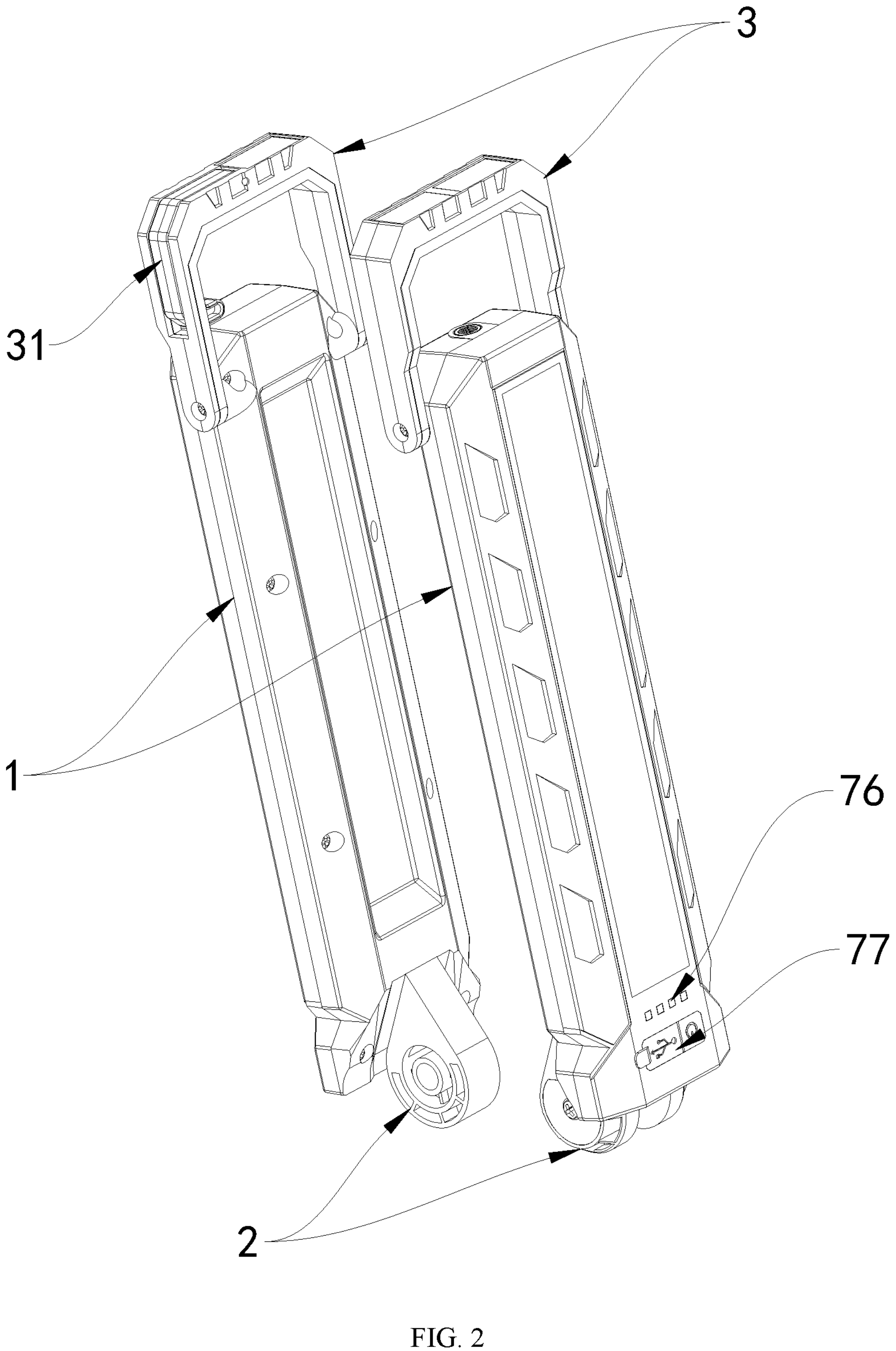
FIG. 2 is the diagram illustrating the separated state of two lamps provided by the invention.
Figure 3:
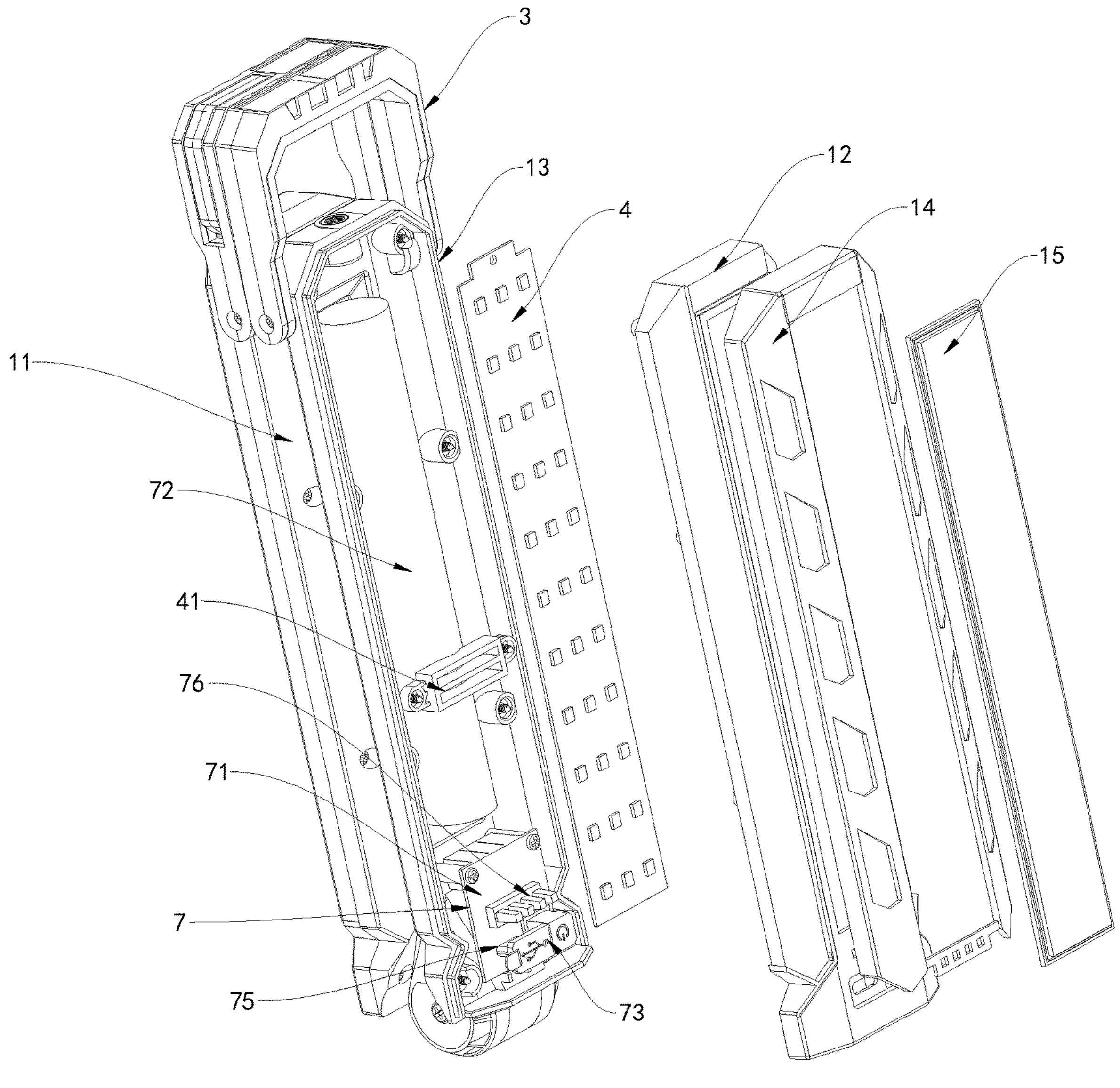
FIG. 3 is the structural explosive view of lamps provided by the invention.
Figure 4:
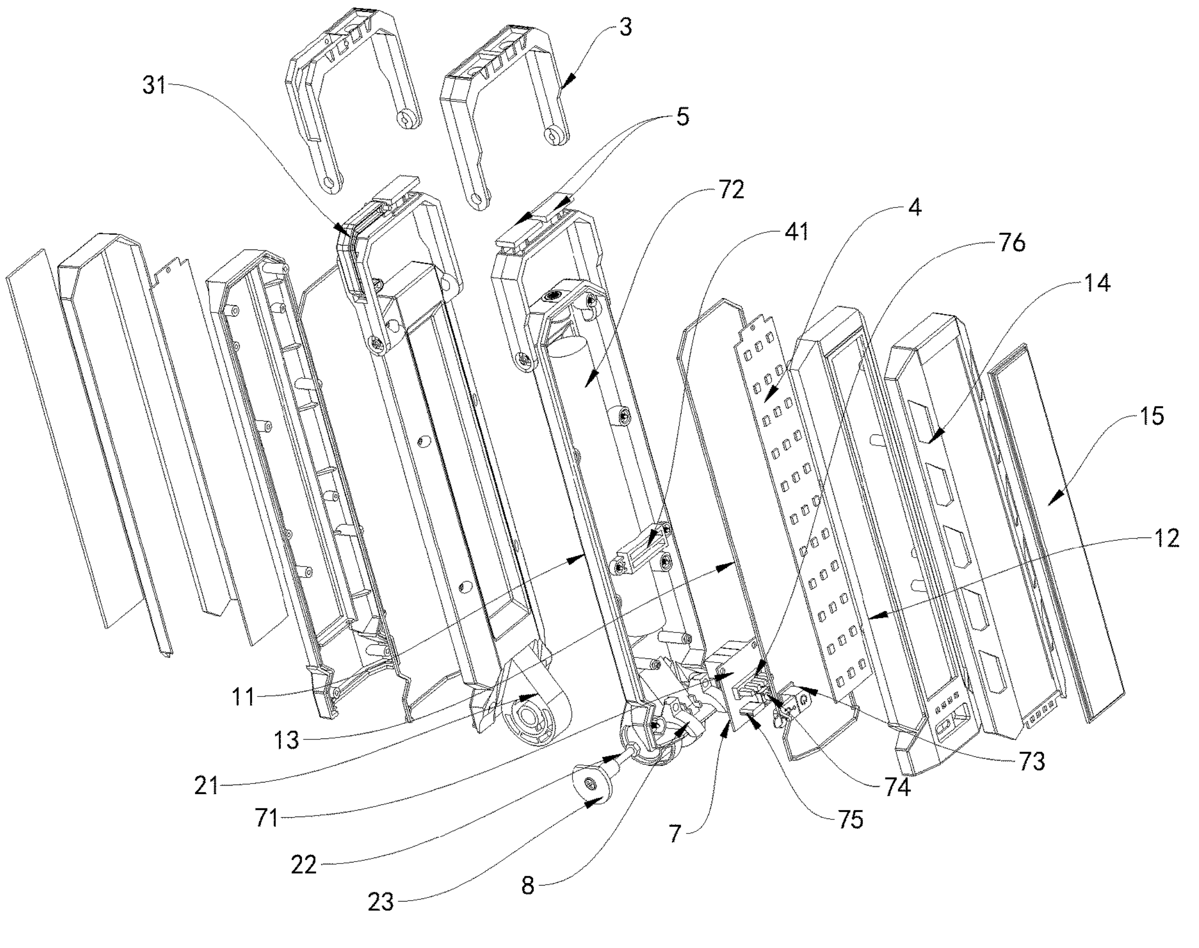
FIG. 4 is the structural explosive view of lamps provided by the invention.

Specifically, one side of said main board 71 is further provided with a light guide member 76 for guiding light to the indicator light set and a silicone button 73 for guarding the on/off button 74 and the charging port 75. With reference to FIG. 2, one end of the light guide member 76 and the silicone button 73 are both connected to one side of the lamp 1 to facilitate observation and operation of user.

Specifically, the interior of said lamp 1 is provided with a waterproof silicone gel 8 located on one side of the main board 71, and the waterproof silicone gel 8 is used to seal the through holes created by the bottom of the lamp 1 avoiding the articulation piece 2.

Specifically, one side of said LED floodlight panel 4 is provided with a light panel presser 41, and said light panel presser 41 is fixed to the interior of the lamp 1 by screws; the LED floodlight panel 4 is fixed to the interior of the lamp 1 by light panel presser 41, which guarantees the stability of LED floodlight panel 4.

Specifically, said lamp 1 includes the first lamp body 11 and second lamp body 12, a sealing ring 13 provided between said first lamp body 11 and second lamp body 12; the arrangement of sealing ring 3 guarantees the leakproofness between the first lamp body 11 and second lamp body 12.

Specifically, one side of said second lamp body 12 is provided with a rubber-coated housing 14, and a lens 15 located on one side of the LED floodlight panel 4 is provided in said second lamp body 12. When the LED floodlight panel 4 is lit, the light penetrates through the lens 15, and the setting of the rubber-coated housing 14 increases the appearance of the lamp 1, being comfortable to touch and having excellent abrasion and shock resistance.

Figure 5:
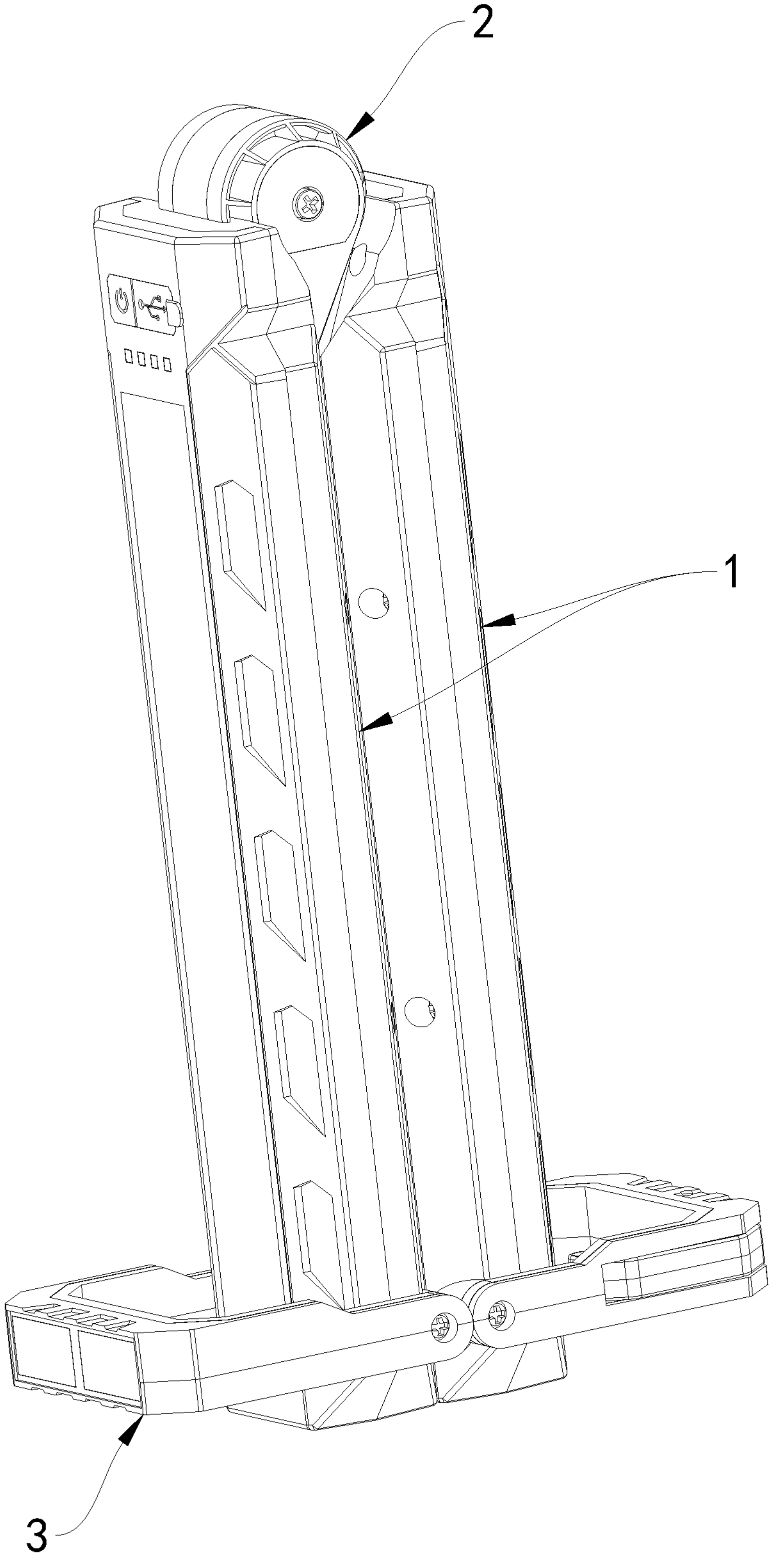
FIG. 5 is the structural diagram of Embodiment 2 provided by the invention.

Embodiment 2, refer to FIG. 5, merge said two lamps 1 and flip the two handles 3 can make the lamps 1 stand on the plane or fixed on the camera bracket through the pre-buried nut 6 using screws.

Figure 6:
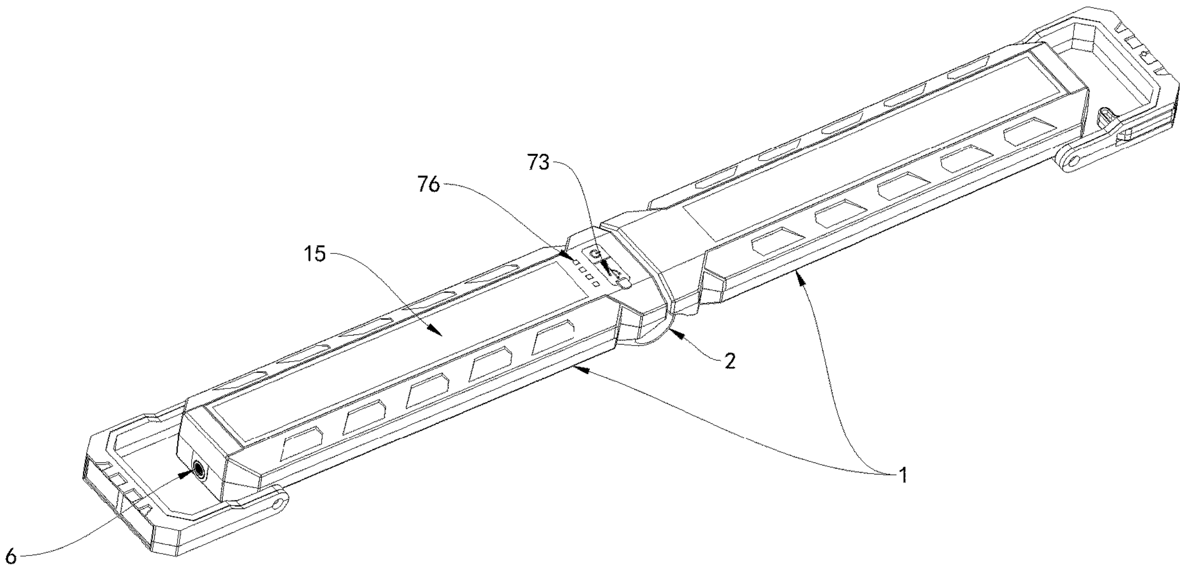
FIG. 6 is the structural diagram of Embodiment 3 provided by the invention.
Figure 7:
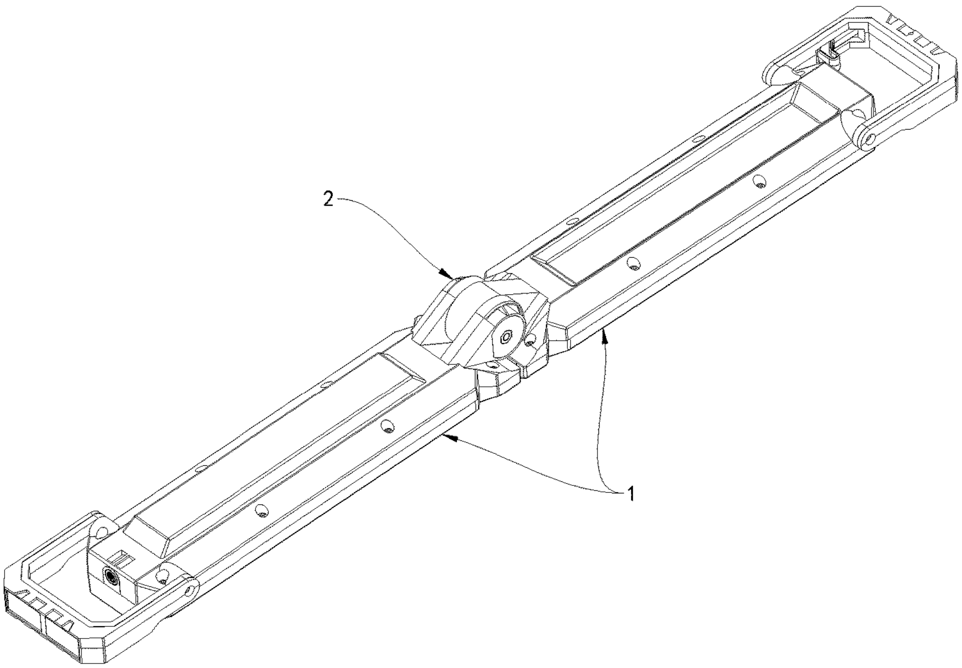
FIG. 7 is the structural diagram of Embodiment 3 provided by the invention.

Embodiment 3, referring to FIGS. 6 and 7, unfolds the two lamps 1 in a linear pattern, allowing the lamps 1 to be used in a flat position.

Figure 8:
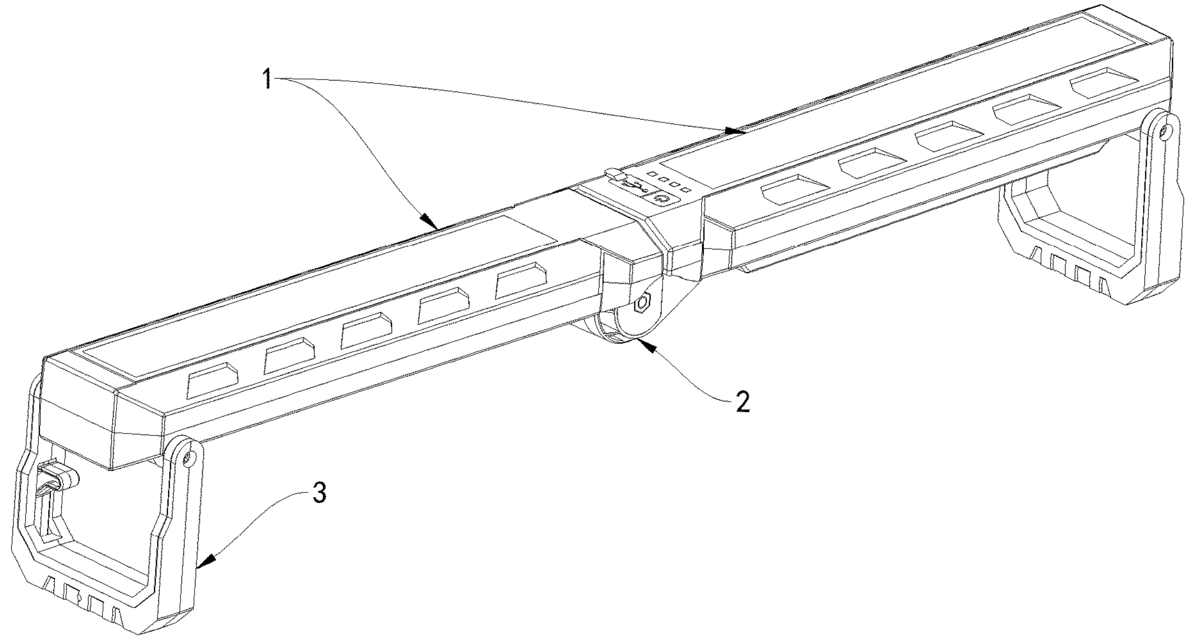
FIG. 8 is the structural diagram of Embodiment 4 provided by the invention.
Figure 9:
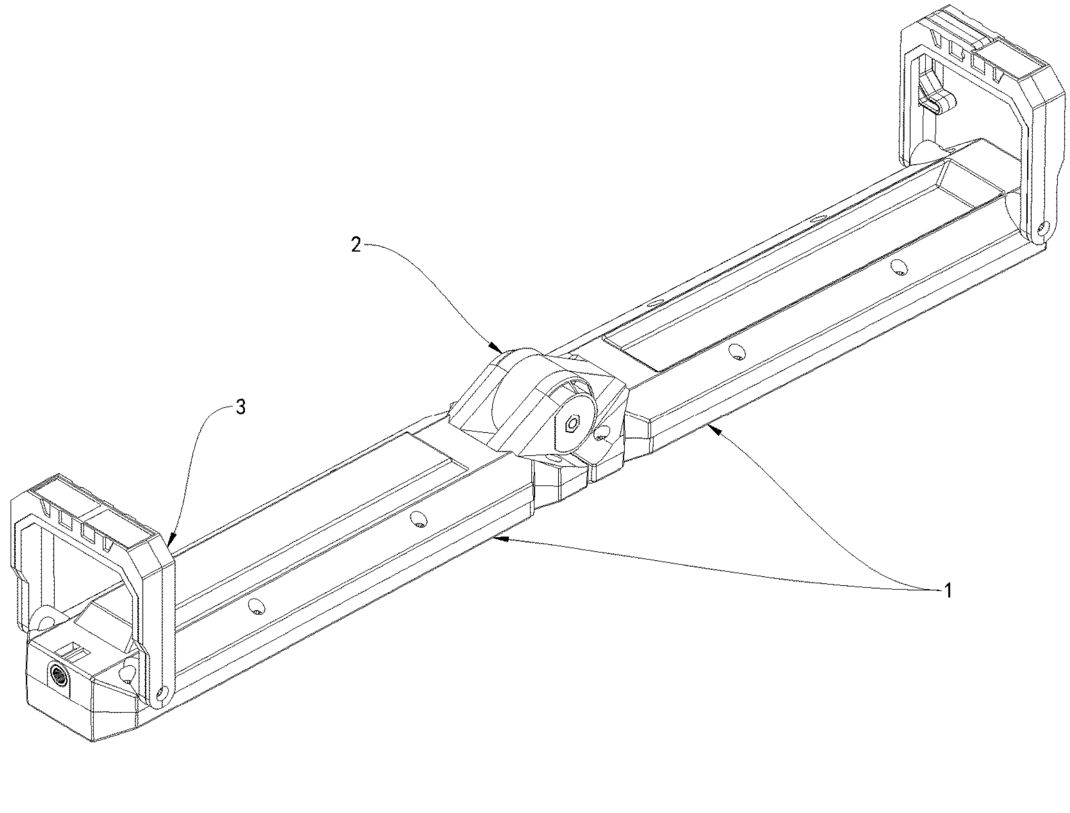
FIG. 9 is the structural diagram of Embodiment 4 provided by the invention.

Embodiment 4, referring to FIGS. 8 and 9, after unfolding the two lamps 1 in linear pattern, flip handle 3 to hang below the lamps 1, which can put the lamp 1 flat and elevate the lamps 1 for use, and also can be used to be adhered on a metal object by the magnet 5.

Figure 10:
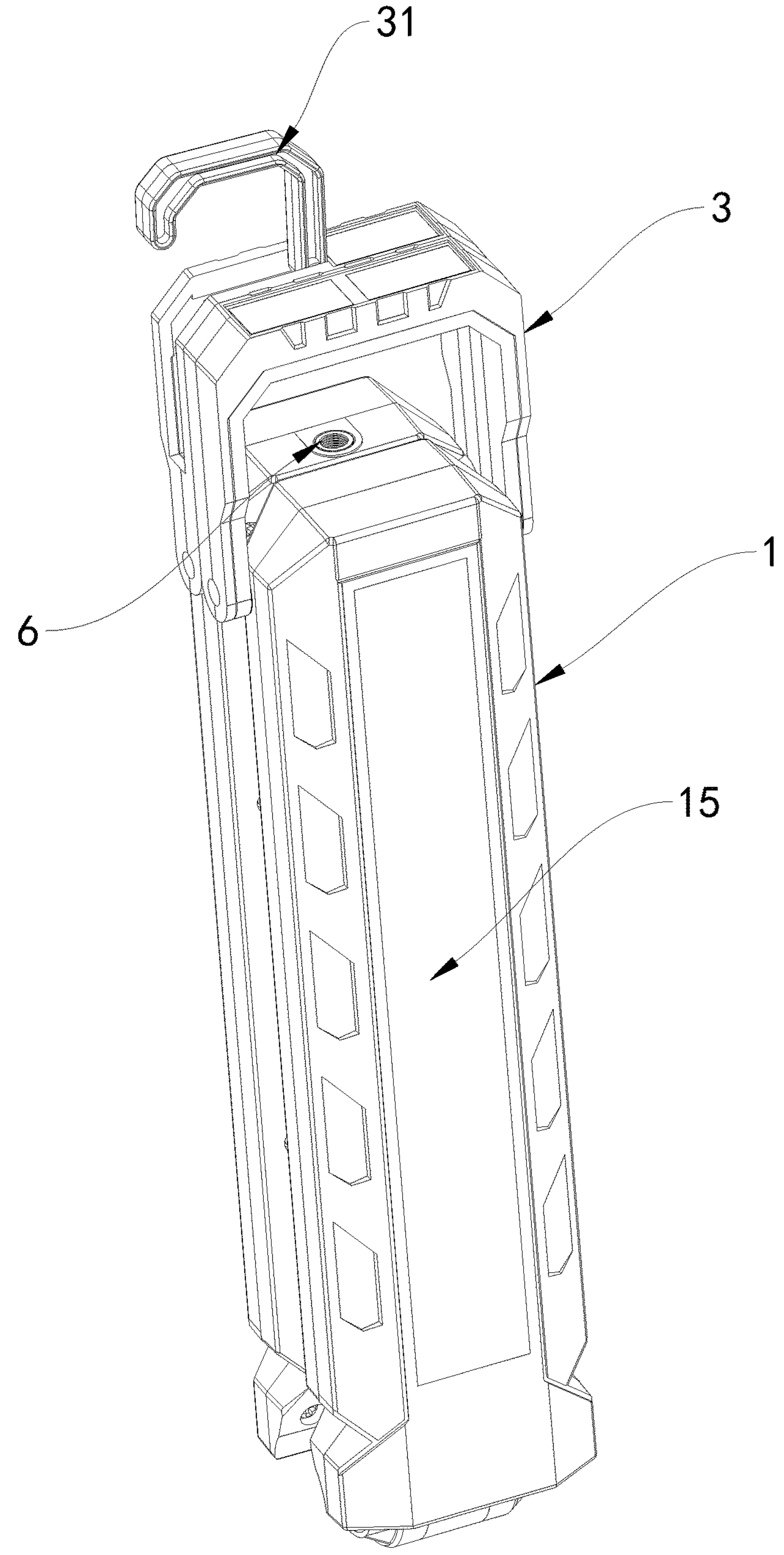
FIG. 10 is the structural diagram of Embodiment 5 provided by the invention.

Embodiment 5, refer to FIG. 10, flip out the hook 31, the lamps 1 can be mounted on the rope, pole, branch for use, with broader application scene.

Figure 11:
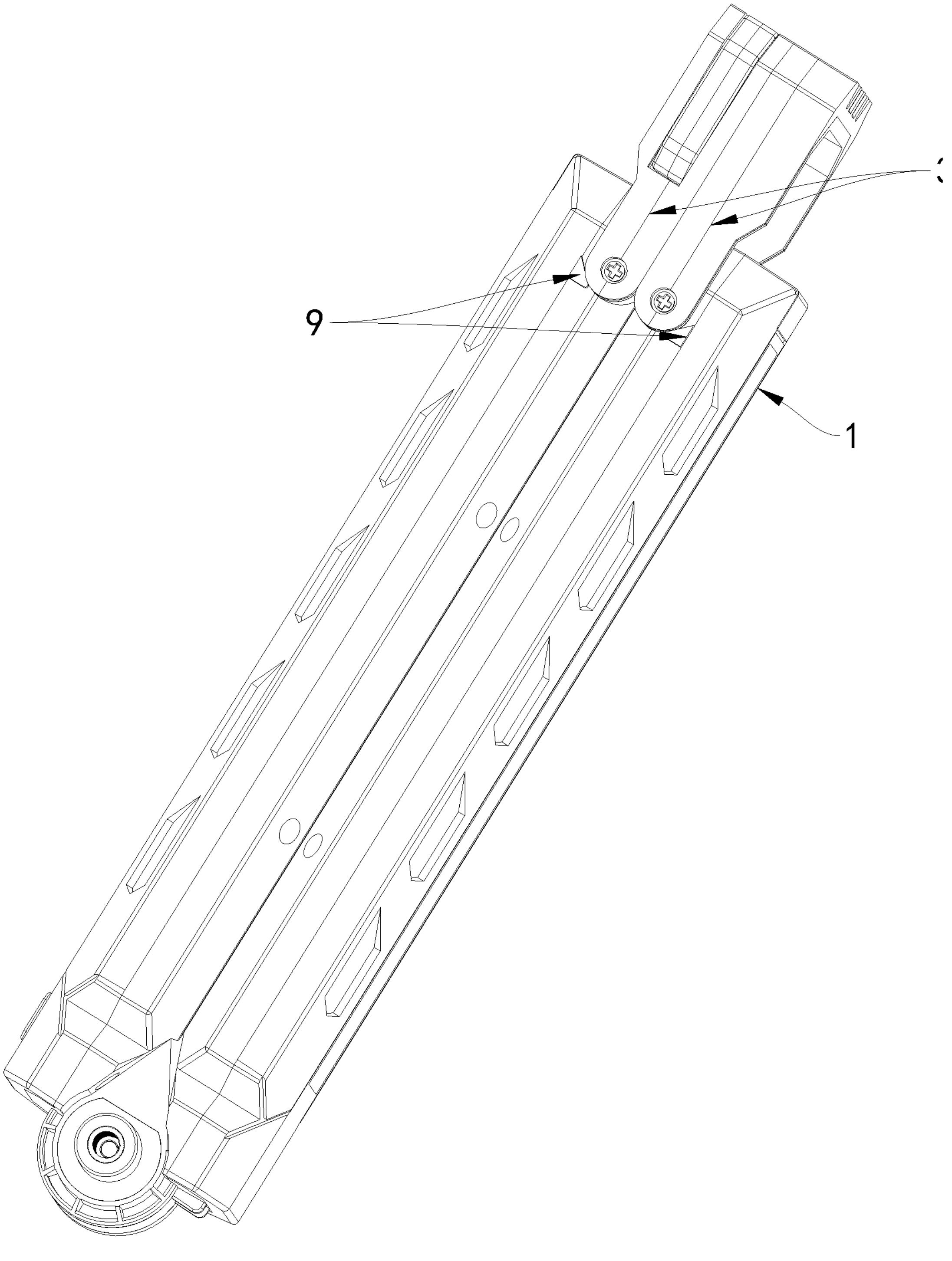
FIG. 11 is the structural diagram of Embodiment 6 provided by the invention.
Figure 12:
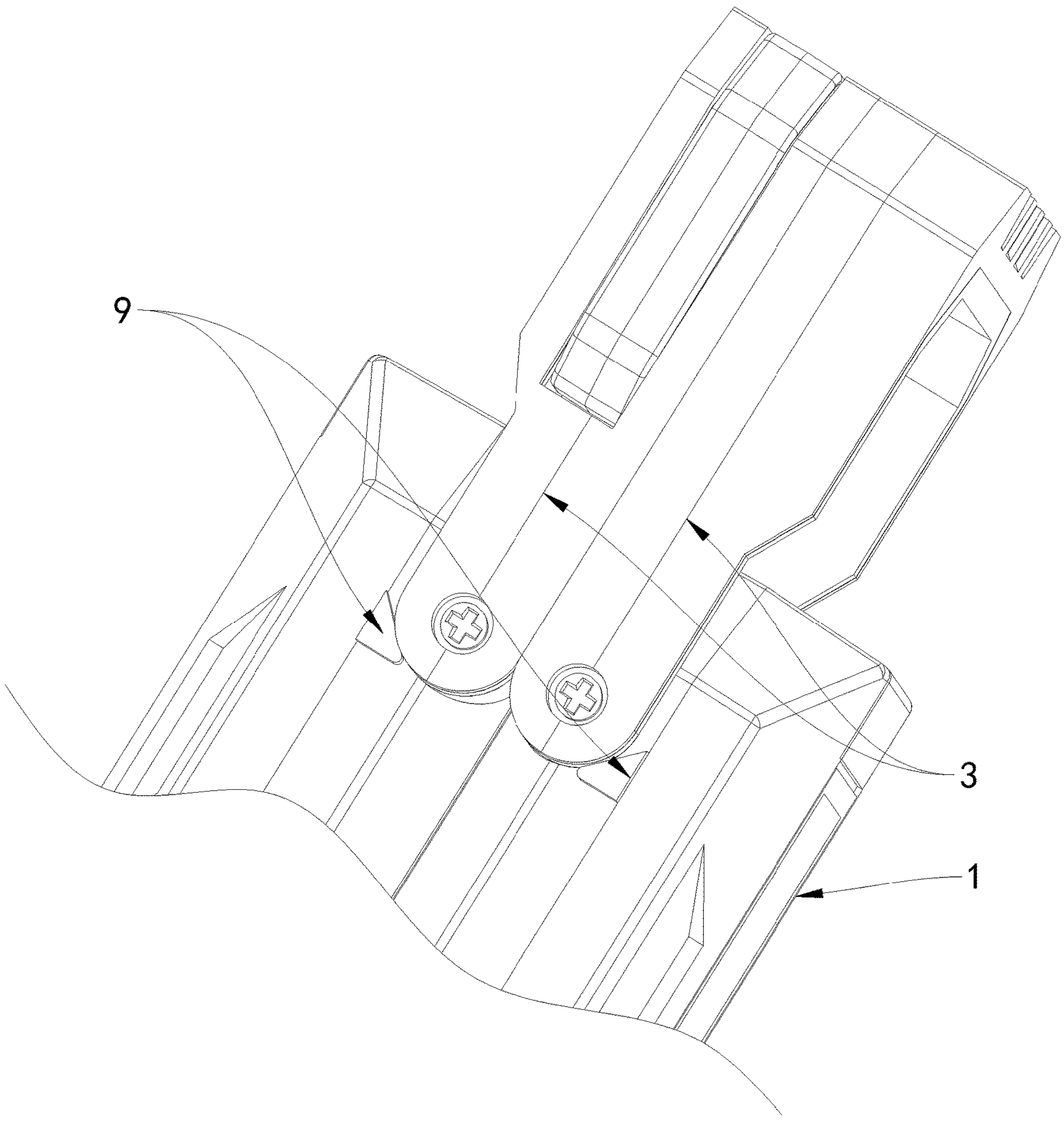
FIG. 12 is the structural diagram of Embodiment 6 provided by the invention.

Embodiment 6, referring to FIGS. 11 and 12, it also includes positioning blocks 9 arranged on both sides of the lamps 1, said positioning blocks 9 are located on one side of the handles 3, said positioning blocks 9 are triangular in shape, which have beveled surface on one side toward the handles 3, when the two lamps 1 are merged, flipping handle 3 against the beveled surface of the positioning blocks 9 to achieve positioning of the handle 3, and the lamps 1 can be supported by the handles 3. Since the two handles 3 are triangularly shaped in combination with the support surface after being positioned by the positioning blocks 9, the support stability is ensured.

In conclusion, in the foldable double-sided light-emitting floodlight, compared with floodlights with single use on market, articulation piece 2 can adjust the angle between two lamps 1, so that it has a variety of using ways of standing, laid flat, elevating and laid flat, magnetic suction, hanging, and can be matched with camera frame to cope with uses in different scenarios, with a broad application prospect and meets the economic benefits.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A foldable double-sided light-emitting floodlight, comprising two lamps (1), the bottom of which are movably hinged via an articulation piece (2), and the angle between the two lamps (1) can be adjusted through the articulation piece (2); the top of lamps (1) is provided with handles (3) for carrying the lamps (1), inside one of the handles (3) movably provided with a hook for hanging the lamps (1); LED floodlight panels (4) are arranged inside the lamps (1); the top of said handle (3) is embedded with not less than one magnet (5), and the top of one of said lamps (1) is pre-built with a nut (6).

2. The foldable double-sided light-emitting floodlight of claim 1 wherein the articulation piece (2) includes hinged seats (21) provided at the bottom of two lamps (1) respectively and rotating shaft (22) running through two hinged seats (21), two ends of said rotating shaft (22) are sleeved with rotating shaft presssers (23).

3. The foldable double-sided light-emitting floodlight of claim 1 wherein a control component (7) electrically connected to two LED floodlight panels (4) is provided inside one of said lamp (1).

4. The foldable double-sided light-emitting floodlight of claim 3 wherein said control component (7) comprises a main board (71) and a battery (72) electrically connected to the main board (71), and indicator light set, a on/off button (74) and a charging port (75) are integrated on one side of said main board (71).

5. The foldable double-sided light-emitting floodlight of claim 4 wherein one side of said main board (71) is further provided with a light guide member (76) for guiding light to the indicator light set and a silicone button (73) for guarding the on/off button (74) and the charging port (75).

6. The foldable double-sided light-emitting floodlight of claim 5 wherein the interior of said lamp (1) is provided with a waterproof silicone gel (8) located on one side of the main board (71).

7. The foldable double-sided light-emitting floodlight of claim 1 wherein one side of said LED floodlight panel (4) is provided with a light panel presser (41), and said light panel presser (41) is fixed to the interior of the lamp (1) by screws.

8. The foldable double-sided light-emitting floodlight of claim 1 wherein said lamps (1) include the first lamp body (11) and second lamp body (12), a sealing ring (13) provided between said first lamp body (11) and second lamp body (12).

9. The foldable double-sided light-emitting floodlight of claim 8 wherein one side of said second lamp body (12) is provided with a rubber-coated housing (14), and a lens (15) located on one side of the LED floodlight panel (4) is provided in said second lamp body (12).

* * * * *